(12) United States Patent
Mathews et al.

(10) Patent No.: US 7,616,131 B2
(45) Date of Patent: Nov. 10, 2009

(54) METHOD AND APPARATUS FOR ALLOWING RUNTIME CREATION OF A USER EXPERIENCE FOR A WIRELESS DEVICE

(75) Inventors: Ajit Mathews, Plantation, FL (US); Jiji Mathews, Plantation, FL (US); Steven J. Nowlan, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 267 days.

(21) Appl. No.: 11/549,803

(22) Filed: Oct. 16, 2006

(65) Prior Publication Data

US 2008/0092041 A1    Apr. 17, 2008

(51) Int. Cl.
    *G08G 1/123* (2006.01)
(52) U.S. Cl. .................. 340/989; 340/539.1; 340/473; 455/567; 715/744
(58) Field of Classification Search .......... 340/989, 340/825.22, 825.24, 825.25, 990–995.1, 340/995.16, 473, 539.1, 566, 568.8; 455/567; 715/744
See application file for complete search history.

(56) References Cited

U.S. PATENT DOCUMENTS 6,125,281 A * 9/2000 Wells et al. ............. 455/466
6,694,143 B1 * 2/2004 Beamish et al. .......... 455/456.1
6,937,868 B2 * 8/2005 Himmel et al. .......... 455/456.4
2003/0100261 A1 * 5/2003 Gusler et al. ............... 455/18
2005/0102632 A1 * 5/2005 Klinger et al. ............. 715/789

OTHER PUBLICATIONS

Sauer, et al., "UML-based Behavior Specification of Interactive Multimedia Applications," Proceedings of the IEEE Symposia on Human-Centric Computing Languages and Environments, Sep. 5-7, 2001, pp. 248-255.

* cited by examiner

*Primary Examiner*—Benjamin C Lee
*Assistant Examiner*—Daniel Previl (57) ABSTRACT

An apparatus [100] includes an application layer [205] to present an application behavior specification and a presentation specification. An engine layer [305] receives at least one input corresponding to a proposed modification to at least one of the application behavior specification and the presentation specification. A modality interface layer [215] interprets the at least one input and merges the at least one input into an output. An interaction management layer [210] (a) receives the output; (b) determines permitted modifications to the at least one of the application behavior specification and the presentation specification based on a set of pre-defined rules; and (c) generates a new application by modifying the at least one of the application behavior specification and the presentation specification at run-time based on the permitted modifications.

17 Claims, 7 Drawing Sheets

METHOD AND APPARATUS FOR ALLOWING RUNTIME CREATION OF A USER EXPERIENCE FOR A WIRELESS DEVICE

TECHNICAL FIELD

This invention relates generally to a method, apparatus, and system for enabling runtime creation of a user experience for a wireless device.

BACKGROUND

Different behaviors (both with respect to a device and a person) are restricted by social and legal policies, yet the devices (and sometimes also the people) are often not aware of these policies or choose to ignore them. For example, a ringing phone is generally discouraged both in a movie theatre and a church, and is fully prohibited on airplanes in flight and in some hospitals. Conversely, a ringing phone would probably not be heard at a sporting event or in a loud nightclub.

Promoting appropriate behavior in a wireless device (or appropriate behavior of the person by restricting the wireless device) can be accommodated by notifying the wireless device of local restrictions and permitting the device to respond in some alternative fashion that does not violate those constraints (typically confined to a space but could also be confined to a period of time).

Some systems in the current art utilize "signal blockers" in places such as opera houses and theatres. Also, some systems implement a forced "turn-off" of a transmitter in certain conditions, such as on an airplane.

Current wireless devices do not typically have the ability to allow creation at run-time of applications. Such devices do not permit a user to create the user's own applications and to share those applications with other user devices. There is a device in the art allowing a user to change a controls layout. This device, however, does not permit the user to create the user's own controls on the fly (i.e, during run-time). Current wireless devices also fail to allow for the changing of the behavior of a particular control. Some wireless devices have capabilities to add only graphical modality controls, but not voice or haptic (i.e., feedback notification) controls. These wireless devices also do not provide a way to modify screen flow during run-time for themselves. Such designs further fail to allow for the combining of elements of one or more applications into a new application.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

According to various embodiments described below, a system, method, and apparatus are provided that allow a user of a wireless device to create a customizable user experience for the wireless device on the fly (i.e., during run time; while the wireless device is being operated in a substantially normal mode, which may maintain an ability for the wireless device to make a call during such creation activities, and which may avoid having to put the wireless device into a "software modification mode" that could exclude, for example, connection to a wireless system).

The user experience may be altered by, for example, changing the controls for an application or changing a screen flow for the application. The user may also change the behavior of a particular control of the wireless device. An example of a behavior change for a control is to accept only numbers instead of just characters. Elements from one or more applications may be selected and combined to form a new application.

A screen flow may also be modified during run-time. An example of an original screen flow for a text messaging application is: Create Message→Text Message→Enter Destination→Enter Text. An example of a modification of the screen flow is: Create Message→Text Message→Enter Text→Enter Destination.

The ability to combine elements of one or more applications into a new application permits a wireless device having two different applications to create a new application. For example, a first application may be for taking a picture and saving it to the wireless device, and a second application may be for creating a Multimedia Messaging Service ("MMS") message body, addressing it to someone in a contacts list, and sending it as a Short Messaging Service ("SMS") message. The user may subsequently create a third application based on elements from the first and the second applications, where the third application takes a picture, saves it as an MMS message body, and addresses it to someone in the contacts list by combining pieces of the first application and the second application dynamically.

Another aspect of these teachings is the ability to create and attach voice modality (and other modalities) or use multimodal inheritance from a donor to a new target application.

So configured, these teachings provide a highly leverageable and flexible context within which an individual user can devise tools, capabilities, short-cuts, and so forth to greatly increase the value of their device(s). These embodiments can be readily adapted for use with any of a wide variety of devices including various one-way and two-way communications devices.

Figure 1:
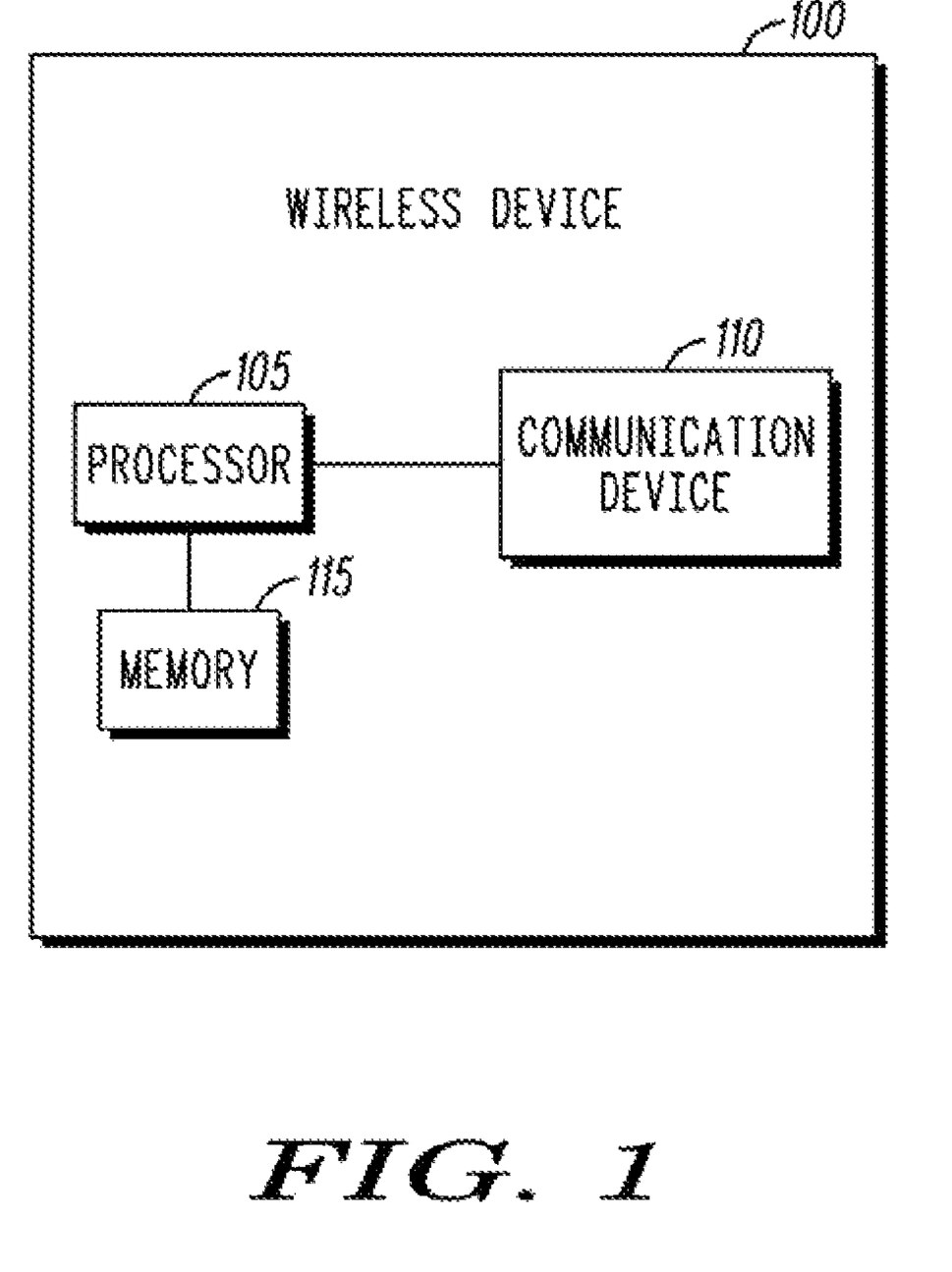
FIG. 1 illustrates a wireless device according to at least one embodiment of the invention.

FIG. 1 illustrates a wireless device 100 according to at least one embodiment of the invention. The wireless device 100 may comprise, for example, a Personal Digital Assistant ("PDA"), a cellular phone, or any other type of portable wireless device. As shown, the wireless device 100 includes a processor 105, a communication device 110, and a memory 115. The communication device 110 may be utilized to transmit and receive messages and data, such as audio or voice data, to and from other devices. The messages and data may be received from other wireless devices or hard-wired devices. For example, messages and/or data may be received from a PDA carried by another user. Messages and data may also be received from a communication device permanently mounted within, for example, a movie theatre. The memory 115 of the wireless device may include program code for implementing various application programs. For example, the memory 115 may store program code for an e-mail application program or a text messaging application program to be executed by the processor 105.

The wireless device 100 may provide a user with an ability to create simple user applications by modifying the declarative and behavior representations of various controls or applications on the fly using a runtime editing tool and the ability to save the same as a new application. This provides the ability to allow the user to create the user's own new applications as well as a unique personality for an application, such as using the user's own voice prompts, favorite strings, User Interface ("UI") flow, and data fields.

The overall architecture of the framework which creates/adapts the user experience for the wireless device 100 is based on the plurality of input and output devices discussed below with respect to FIGS. 2-4. This architecture has behavior and presentation specifications separate from application logic. Specifying behavior and presentation that is controlled by an application has been proposed for aiding the software engineering design process that occurs before an application is written (for example, see Stefan Sauer et al., "UML-based Behavior Specification of Interactive Multimedia Applications",); The embodiment of behavior and presentation as specifications (e.g., files) separated from and modifiable by running applications is a new and unique use that provides new benefits. This architecture allows changing not only the presentation but also the behavior (such as screen flow). The behavior is specified declaratively by use of frames. Unlike conventional programming techniques where the behavior is hard-coded, the behavior is instead stored in a structured format such as XForms of Extensible Markup Language ("XML") dialect. Accordingly, the user can change the behavior and save frames without having to recompile the code.

The screen flow may also be modified during run-time. An example of an original screen flow for a text messaging application is: Create Message→Text Message→Enter Destination→Enter Text. An example of a modification of the screen flow is: Create Message→Text Message→Enter Text→Enter Destination.

This architecture also provides the ability to add new controls including both UI controls and haptic controls, instead of just UI controls. The frame representation presents capabilities to the user as a set of easy-to-understand, high-level goals and rules. By recombining goals and rules from several existing applications, the user can create powerful new applications without needing to understand any form of implementation detail.

The frame representations edited are amodal, so users can re-use multimodal components of existing applications without having to do any modality-specific design work. As a simple example, if in creating a "take a picture and send it to someone without saving it" application takes an element from an MMS-creating application that allowed a picture in an MMS body to be captioned by either handwriting, keypad or voice, a new "take a picture and send it" application would inherit all three modalities automatically.

The method and system discussed below does not require any backend server to create a new application user experience; this can be done on the wireless device 100 itself. Additionally, no additional compilation or downloading steps are required, as the application can be directly interpreted on the wireless device 100.

Figure 2:
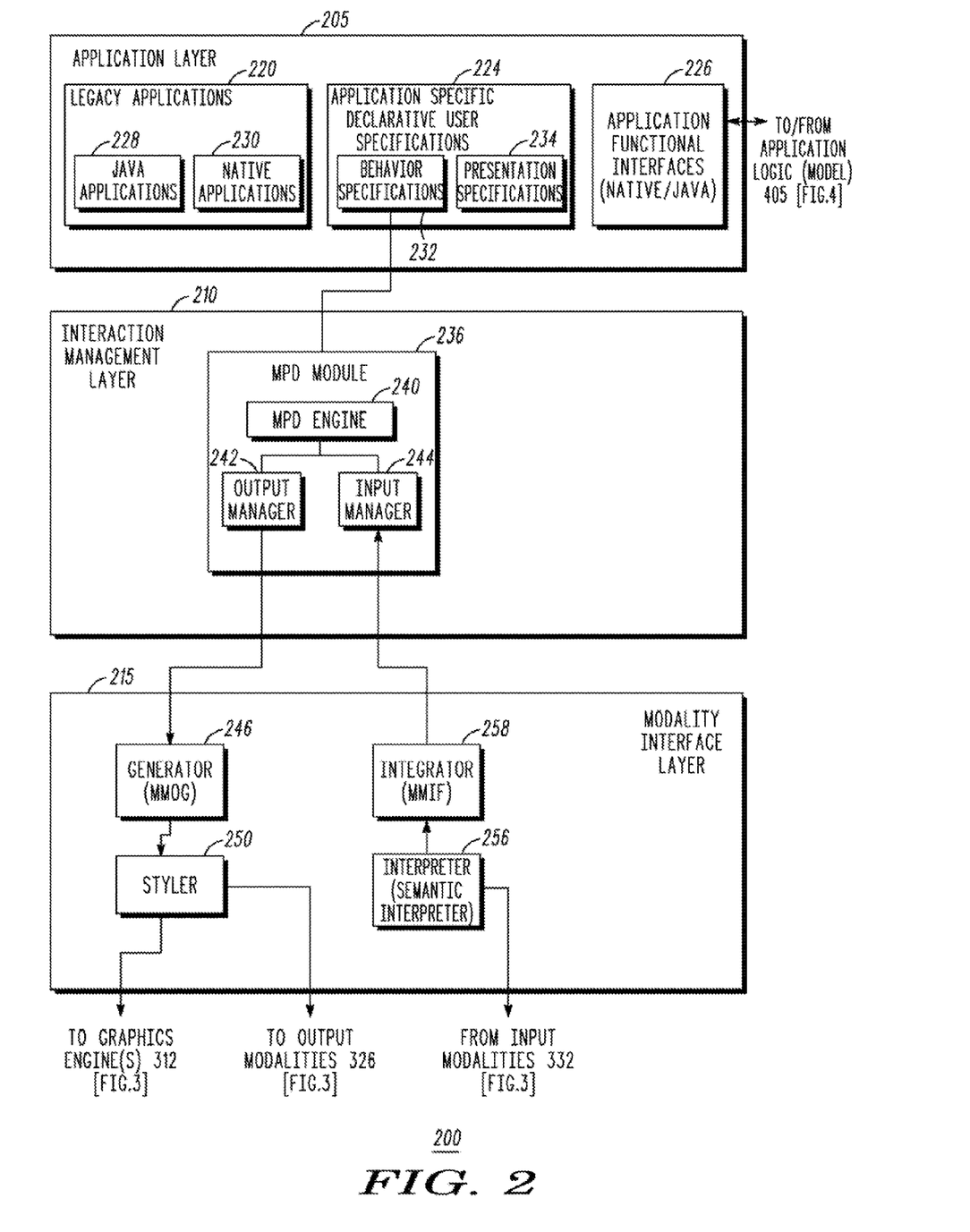
FIG. 2 illustrates a first portion of a system architecture that adapts a user's experience of the wireless device according to at least one embodiment of the invention.

FIG. 2 illustrates a first portion 200 of a system architecture that adapts a user's experience of the wireless device 100 according to at least one embodiment of the invention. The processor 105 of the wireless device 100 may implement the first portion 200 of the system architecture. As shown, the first portion 200 of the system architecture includes various layers, including an application layer 205, an interaction management layer 210, and a modality interface layer 215. The application layer 205 is comprised of user interface applications and several background services running on the wireless device 100.

The application layer 205 includes various elements, including legacy applications 220, application specific declarative user interface specifications 224, and application functional interfaces 226. The legacy applications 220 include java applications 228 and native applications 230, such as C, C++, and java applications and/or services native to the wireless device 100. The application specific declarative user interface specifications 224 include application behavior specifications 232 and presentation/view specifications 234 (more simply referred to as presentation specifications 234). That is, the declarative user interface specifications 224 include declarative specifications for the presentation (e.g., view or voice characteristics) and declarative specifications for the behavior (e.g., screen flows).

The application functional interfaces 226 include interfaces for native and java applications and are in communication with an application logic model 405 shown below in FIG. 4. The application specific declarative user interface specifications 224 may be based on different carriers' requirements, including those from carriers such as Vodafone™, Sprint™, and Nextel™.

As shown in FIG. 2, the application layer 205 has a clean separation of the application behavior specification 232 and presentation specification 234. This means that the application behavior can be changed separately from the presentation specifics, and vice-versa. Accordingly, this allows the user to change the presentation separate from the behavior. The presentation may include both the graphics modality and voice modality.

The interaction management layer 210 is responsible for maintaining the interaction state and context of the application and responds to input from the user and changes to the system. An interaction manager then manages these changes and coordinates input and output across the modality interface layer 215.

The interaction management layer 210 includes an Interaction Module 236 (which may be a Modular Portable Dialog ("MPD") MPD module in some embodiment). The Interaction Module 236 includes an Interaction Engine 240 (which may be an MPD engine in some embodiments), an output manager 242, and an input manager 244. The MPD module 236 is in communication with the application specific declarative user interface specifications 224. The MPD module 236 may control the display of the application specific declarative user interface specifications 224 to the user. The MPD engine 240 is responsible for authoring and executing multi-modal dialogs between the user and the wireless device 100. The MPD engine 240 is designed to enable natural language dialogs with the wireless device 100 and is also capable of managing non-linguistic input and output modalities, such as graphical user interfaces.

The interaction management layer 210 is responsible for generating and updating the presentation by processing user inputs and possibly other external knowledge sources (such as a learning engine or context manager) to determine the intent of the user. The interaction management layer 210 includes groups of goals and rules for goal satisfaction that may be arbitrarily recombined into new groupings with interactions resolved automatically. This can be useful with respect to enabling the ability of the user to simply grab functional goals and associated rules from several existing applications and create entirely new applications without debugging or true programming. Additionally, this can help the user in creating the user experience based on some of the learning from the past history of what the user wants to do and also have the context-aware aspect which can help the user while creating the user experience based on some of the learning from the past history of what the user wants to do. An example would be where the user would like to keep the most recently used application versus the least used application.

The modality interface layer 215 provides an interface between semantic representations of I/O processed by the interaction management layer 210 and modality specific I/O content representations processed by an engine layer 305, discussed below with respect to FIG. 3. The modality interface layer 215 includes a Multi-Modal Output Generator ("MMOG") 246. The generator 246 is responsible for generating more than one modality of output including, for example, graphics, voice, and text. The generator 246 may take different types of prompt representations and create appropriate markups for various modalities from them, either through translation or by synthesis. For example, synthesis may comprise combining stored representations with partial prompt specifications such as combining a stored screen representation with a partial description of one of the screen fields. The generator 246 is in communication with a styler 250. The styler 250 adds information about how the representation is laid out. The styler 250 may include a Cascade Style Sheet ("CSS") or a Voice CSS. The styler 250 is in communication with a graphics engine 312 and output modalities 326 of FIG. 3.

Figure 3:
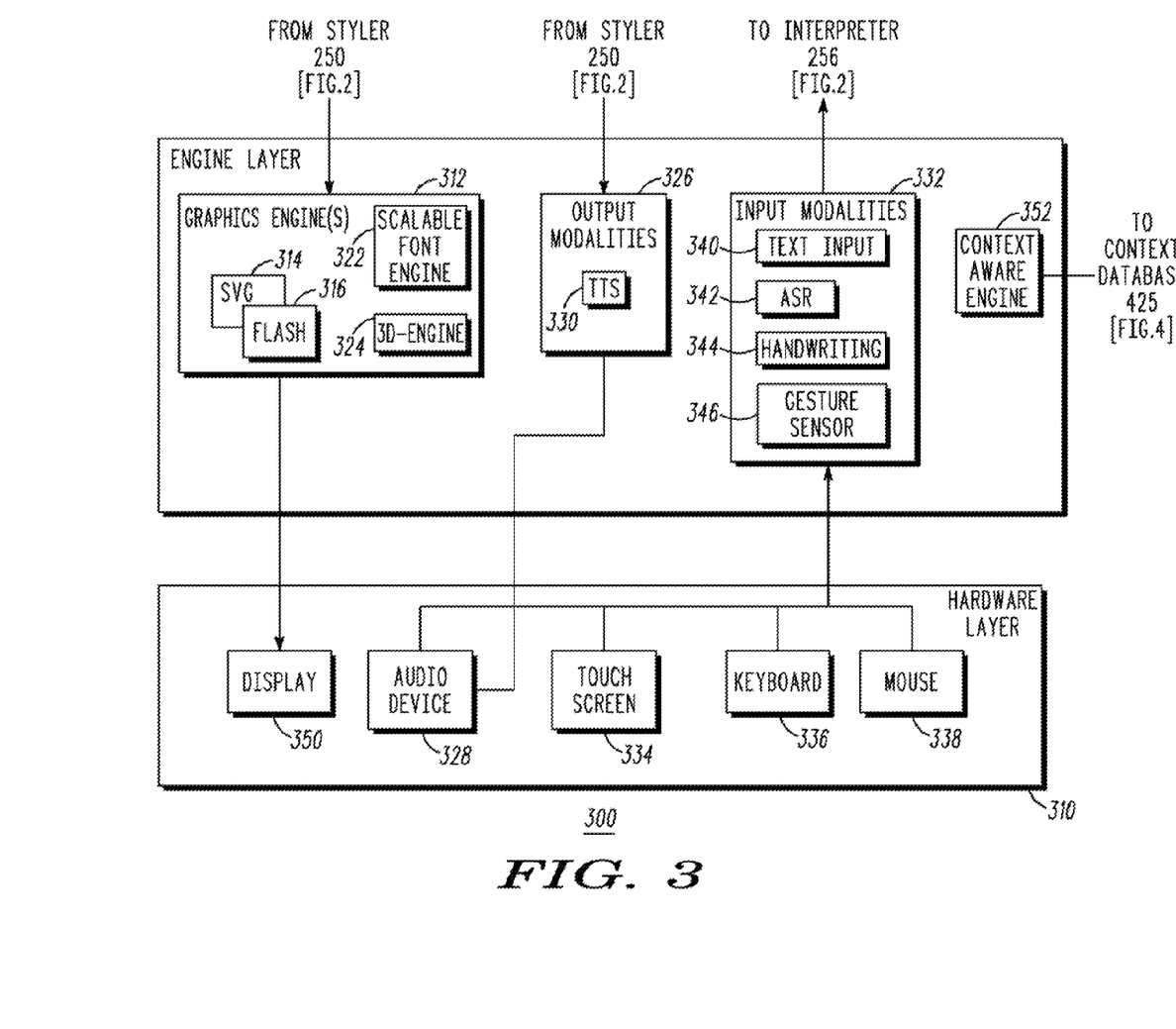
FIG. 3 illustrates a second portion of a system architecture that adapts a user's experience of the wireless device according to at least one embodiment of the invention.

A semantic interpreter 256 receives inputs from input modalities 332 of FIG. 3, and generates outputs to an integrator 258. The semantic interpreter 256 is responsible for transforming the user's actions into a carrier-independent representation of the user action, i.e., to transform physical events to semantic events. The integrator 258 may be a multi-modal input fusion ("MMIF") integrator. The integrator 258 is responsible for fusing events from several separate modalities into a single logical event. The integrator 258 generates outputs to the input manager 244 of the interaction management layer 210. A goal and functionality of the combination of the semantic interpreter 256 and the integrator 258 is to create modality state awareness and synchronize various modalities.

The modality interface layer 215 provides an interface between semantic representations of input/output ("I/O") processed by the interaction management layer 210 and modality-specific I/O content representations processed by an engine layer 305 discussed below with respect to FIG. 3. The separation of the amodal interaction elements from the modality-specific interfaces, and the use of purely semantic representations ensures compositionality of I/O elements across existing applications. This is instrumental in allowing the inheritance of modality and multimodality from existing applications to newly created applications.

FIG. 3 illustrates a second portion 300 of a system architecture that adapts a user's experience of the wireless device 100 according to at least one embodiment of the invention. As shown, the second portion 300 of the system architecture includes an engine layer 305 and hardware layer 310. As with the application layer 205, the interaction management layer 210, and the modality interface layer 215 of FIG. 2, the engine layer 305 may be implemented by the processor 105 of the wireless device 100.

The engine layer 205 includes graphic engine(s) 312. The graphics engine 312 may include a Scalable Vector Graphics ("SVG") module 314, a flash module 316, a scalable font engine 322, and a 3-dimensional ("3-D") engine 324. The graphics engine(s) 312 outputs graphical representations to a display 350 of the hardware layer 310. The graphic(s) engine 312 supports rendering of shapes, Bezier paths, text, full linear 2-Dimensional ("2D") transformation (e.g., scaling, rotation, skewing), anti-aliasing, alpha-blending and image filtering. The graphics engine(s) 312 may be shared by other components such as a Multimedia Engine ("MME") and a GUI stack for rendering and manipulating 2D and 3D graphics. A goal of the graphics engine(s) 312 is to support rendering of "widgets" with variable attributes which can be specified at rendering time (i.e., it supports abstract applications at higher levels). A "widget" may comprise an element such as, for example, a Button, Scroll Bar, or List for a UI application. The graphics engine(s) 312 also rasterizes an image to the display with various orientation and scalable attributes in the declarative specifications 224. Multiple rendering solutions are supported to allow scalability from low to high tier with smooth trade-off of capabilities (e.g., such as flash and SVG). The graphics engine(s) 312 further provides an ability to interface with hardware graphic accelerators (such as those from ATI Technologies, Inc. and NVIDIA® Corp.).

An output modalities module 326 receives an input from the styler 250 of FIG. 2 and generates outputs to an audio device 328 of the hardware layer 310. The hardware layer 310 is responsible for connecting various hardware by means of device drivers. The output modalities module 326 includes a Text-To-Speech ("TTS") module 330, and may include other modality modules, such as a vibration module. An input modalities module 332 receives inputs from various elements of the hardware layer 310, such as the audio device 328, a touch screen 334, a keyboard 336, and a mouse 338. The input modalities module 332 may include, but is not limited to, a text input module 340, an automatic speech recognition ("ASR") module 342, a handwriting module 344, and a gesture sensor 346. The gesture sensor 346 detects gestures made by the user such as, for example, finger movements across the touch screen 334 or movements with the mouse 338.

The engine layer 305 of the system architecture also includes a context aware engine 352. The context aware engine 352 is in communication with a context database 425 shown in FIG. 4. The context aware engine 352 is responsible for learning the context of the user actions and respond to user needs per appropriate constraints/context. An example would be driving home and then prioritizing the home related contacts vs. the work related contacts.

For the output processing the engine layer 305 converts the information from the styling components of the interaction management layer 210 into a format that is easily understood by the user. For example, the graphics engine(s) 312 displays a vector of points as a curved line, and a speech synthesis system converts text into synthesized voice. For the input processing, the engine layer 305 captures natural input from the user and translates the input into a form useful for later processing.

Figure 4:
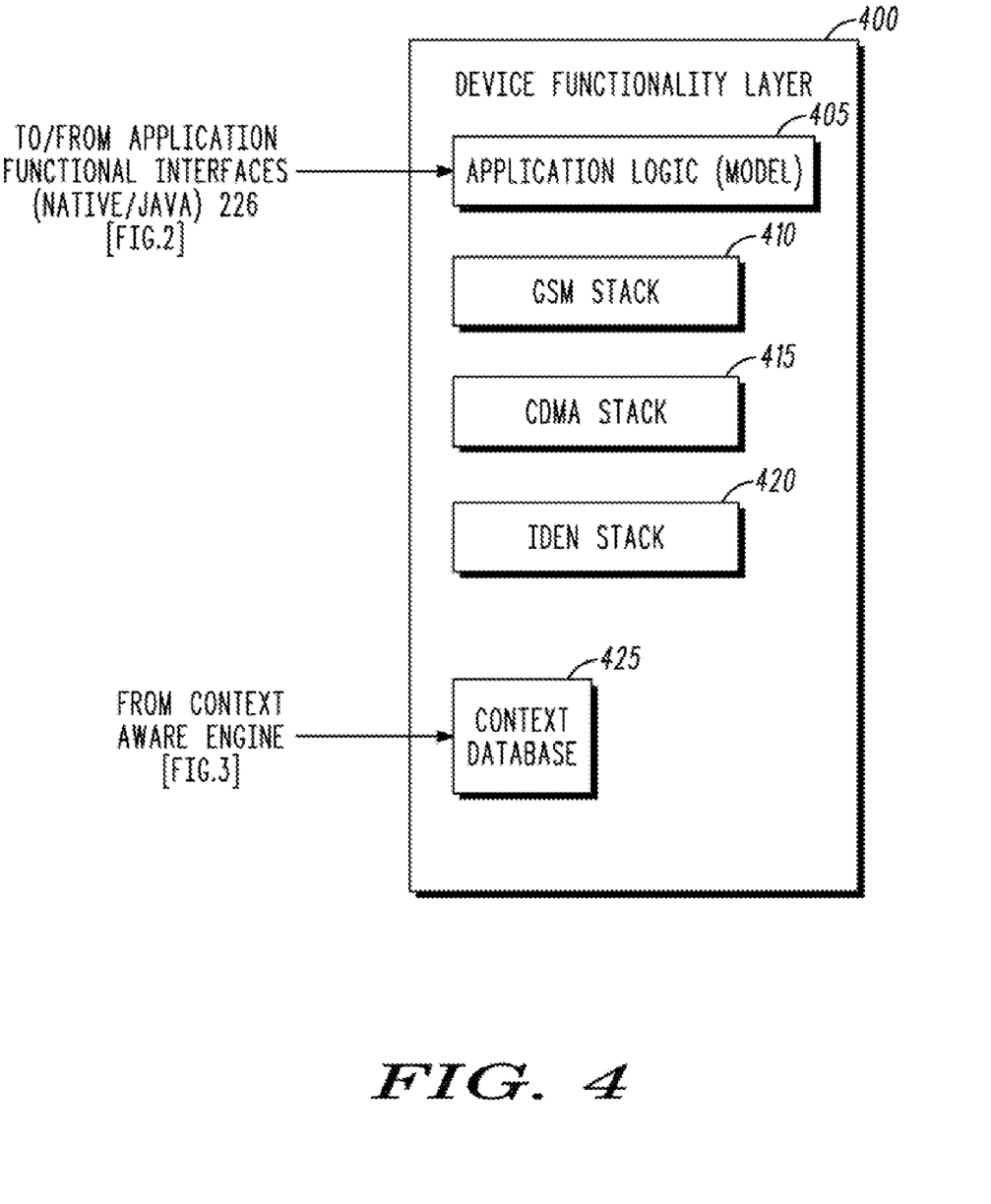
FIG. 4 illustrates a device functionality layer according to at least one embodiment of the invention.

FIG. 4 illustrates a device functionality layer 400 according to at least one embodiment of the invention. The device functionality layer 400 is responsible for various device services. As shown, the device functionality layer 400 may include an application logic (model) 405, a Global System for Mobile Communications ("GSM") stack 410, a Code Division Multiple Access ("CDMA") stack 415, an Integrated Digital Enhanced Network ("Iden") stack 420, and a context database 425. The processor 105 of the wireless device 100 may implement the device functionality layer 400 of the system architecture.

The device functionality layer 400 allows the architecture to interface with device-specific services. That is why the application logic (model) 405, GSM stack 410, CDMA stack 415, Iden stack 420, and the context database 425 are in the device functionality layer 400. For many purposes it can be beneficial to have a clean separation of the device functionality from the application.

Figure 5:
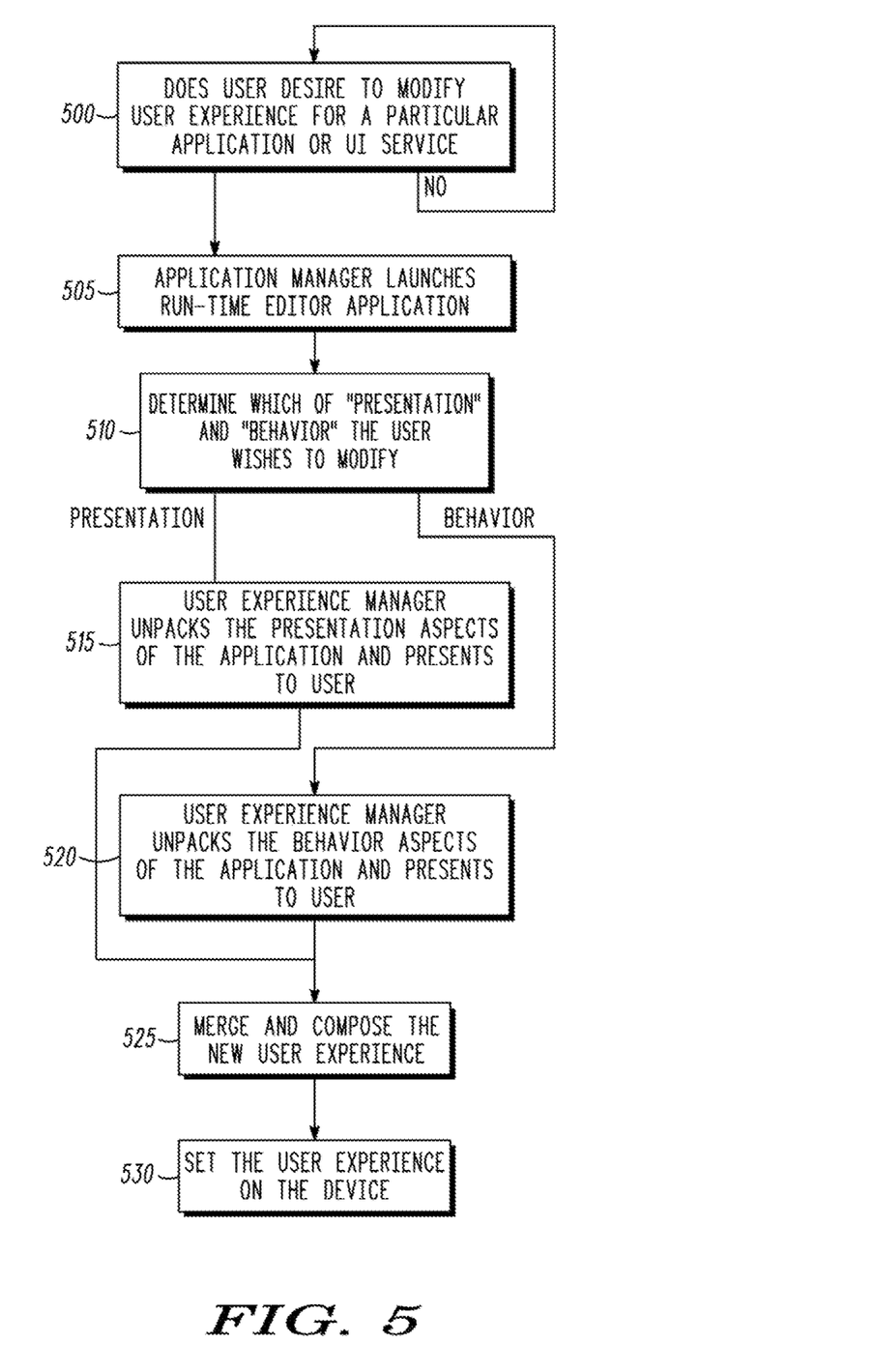
FIG. 5 illustrates a flow diagram for a method to allow runtime creation of the user experience in the wireless device according to at least one embodiment of the invention.

FIG. 5 illustrates a flow diagram for a method to allow runtime creation of the user experience in the wireless device 100 according to at least one embodiment of the invention. First, at operation 500, a determination is made as to whether the user desires to modify the user experience for a particular application or UI service. If "yes," processing proceeds to operation 505. If "no," processing remains at operation 500. Next, at operation 505, the application manager 238 launches a run-time editor application and presents the presentation specification 234 and application behavior specification 232 to the user. The run-time editor application shows the user the set of applications and services that can be modified. The user can learn about what can be modified by launching an online help rules application. These help rules may be packaged per application or for a bundle of applications.

At operation 510 a determination is made as to which of the presentation and the behavior the user desires to modify. If the user desires to modify the presentation, processing proceeds to operation 515 where the user experience manager 245 unpacks the presentation aspects of the application and presents them to the user. The user is given the opportunity to save the specifications and if the changes are successful, the changes can saved to a database. During operation 515, reference may be made to presentation rules and libraries in the database. Processing subsequently proceeds to operation 525.

At operation 510, if it is determined that the user desires to change the behavior, processing proceeds to operation 520 where the user experience manager 245 unpacks behavior aspects of the application and presents them to the user. The user is given the opportunity to save the specifications and if the changes are successful, the changes can be saved to the database. During operation 520, reference may be made to presentation rules and libraries in the database. Processing subsequently proceeds to operation 525.

At operation 525, the new user experience is merged and composed. Application declarative specifications for the new user experience are subsequently saved/updated in one or both of the presentation specifications 234 (such as XML, Xforms, and XHTML) and application behavior specifications 232 (such as frames), depending on the nature of the changes. Finally, at operation 530, the new user experience is set on the wireless device 100.

The architecture described above with respect to FIGS. 1-5 also has the ability to alter its response to a particular environmental signal. The environmental signal may comprise an indication that the wireless device 100 is in a designated quiet area such as a movie theatre or an opera house. Instead of automatically blocking all signals to a wireless device 100 located in, for example, a movie theater, the architecture may instead negotiate with the environment to determine the most suitable solution. Accordingly, via the negotiation, the response of the wireless device 100 may be altered so that incoming signals can be received but the wireless device will not audibly ring. Instead, the wireless device 100 may vibrate for a short length of time, so that the user is informed that a message has been received without annoying other people within the movie theatre.

Accordingly, unlike prior systems, the wireless device's 100 response to an environmental signal is not static or pre-designed. Instead, a dynamic solution is provided that uses all available services and options to provide an optimal solution in the current context.

In an embodiment, a wireless device contains multiple environmental profiles that a user is permitted to set up. These may be pre-populated and then the user may further customize them instead of having to write them completely from scratch. For example, there may be profiles for use in a vehicle, in a public space, in a theatre/presentation, or in an office. Each of these profiles is defined by a number of attributes such as auditory behavior and visual behavior.

When a user carrying the wireless device 100 enters a particular environment, such as by walking into a movie theatre, a wireless device of the particular environment scans the profiles on the user's wireless device and compares the attributes of those profiles to its own environmental attributes, and then picks the profile that mostly closely matches the terms of the environmental attributes and makes that the wireless device's 100 active profile. This way, the user retains control of details of the personalization and adaptation to environmental constraints, but there is still a way to apply an environmental policy.

According to another embodiment, upon entering the environment, wireless broadcasts to the wireless device 100 inform the wireless device of prohibited (or discouraged) behaviors. The wireless device 100 then informs the user of an acceptable alternative response from among all capabilities, either selecting the alternative itself or letting the user make a selection, with the goal of maintaining as much functionality as possible.

For example, upon entering an airplane, the user may be prompted with several alternative modes of operation, such as working in "offline" mode, purchasing the ability to use an 802.11 network within the airplane, or using another service that might be available. Similarly, a phone may announce that audible ringing is discouraged in an important meeting, but that the phone may vibrate or even forward (via, for example, Bluetooth technology) an incoming call alert to the user's laptop that will be open during the meeting. By providing the wireless device 100 with some level of knowledge of the relationship between its capabilities and the purpose for those capabilities (transceiver to make a wireless call, an audible ring to alert of incoming calls), the wireless device 100 can recognize which tasks are changed/diminished and what other capabilities will help to resolve those tasks.

As additional devices are enabled with this approach, they can extend this behavior across networks to include other devices in an attempt to continue to achieve important goals in highly constrained situations. A useful element of this is a mechanism in this regard is a capability of identifying all alternative ways of providing a function and then creating a (potentially ordered) list of these alternatives from which the user can choose. In some embodiments, the alternatives offered may be atomic services, but in general they can be compounds built from multiples service and function elements. Atomic services are services that cannot be achieved via means of multiple composite services.

Figure 6:
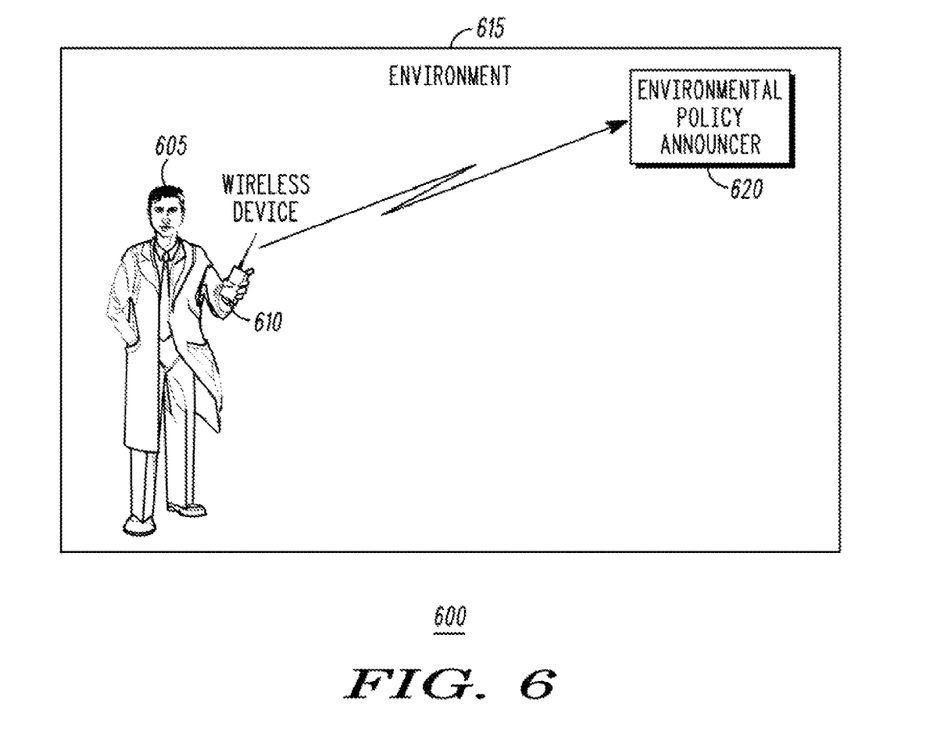
FIG. 6 illustrates a system according to at least one embodiment of the invention.

FIG. 6 illustrates a system 600 according to at least one embodiment of the invention. As shown, a user 605 may carry a portable wireless device 610 into an environment 615. The environment 615 may comprise, for example, a movie theatre, an airplane, or a restaurant having designated policies regarding use of wireless devices such as cell phones. In these environments, there may be a prohibition on audible ringing, or there may be a maximum allowable vibration frequency for notifying the user of an incoming call, so as to avoid disturbing other patrons of the environment 615. The environment 615 may include an environmental policy announcer 620 to notify the wireless device 610 of the environmental policy to be followed within the environment by the wireless device 610. The policy announcer 620 may notify the wireless device 610 via wireless signals.

Figure 7:
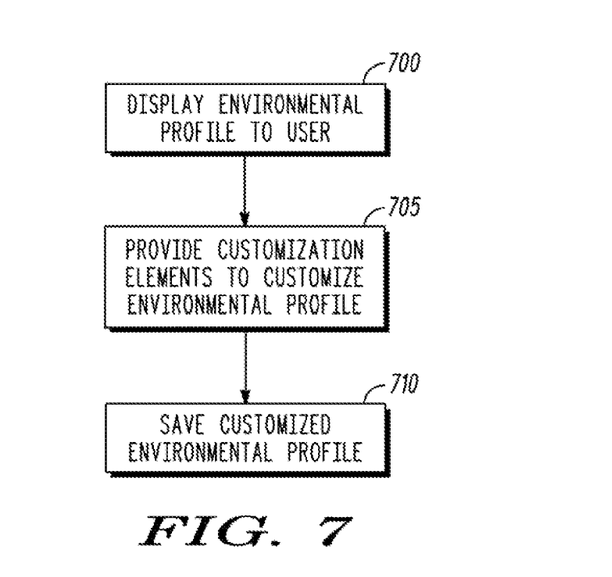
FIG. 7 illustrates a method of customizing an environmental profile for the wireless device according to at least one embodiment of the invention.

FIG. 7 illustrates a method of customizing an environmental profile for the wireless device 610 according to at least one embodiment of the invention. The environmental profile may include a number of different attributes such as, for example, auditory behavior and visual behavior. The visual behavior attributes may include brightness level of a display screen of the wireless device 610, or whether the display screen lights up or blinks when an incoming call or text message, for example, is received. The auditory behavioral attributes may include, for example, a style of ringing or a sound level (e.g., a loudness level) of a ring.

The user may create a set of environmental profiles to control the visual and auditory aspects of the wireless device in different environments. For example, in a "movie theatre" environmental profile, the auditory behavioral attributes may indicate that a ringer of the wireless device 610 is to be disabled but that a vibration of the wireless device 610 is permitted. The visual behavior aspects may indicate the display of the wireless device 610 is not to be flash or is to be displayed with a lower intensity level than would normally be utilized.

Many other environmental profiles may also be created. For example, there may be an "at work" environmental profile, an "airplane" environmental profile, and a "church" environmental profile.

At operation 700 of FIG. 7, an environmental profile is displayed to the user. Next, at operation 705, customization elements are provided to the user to customize the environmental profile. For example, the user may be shown various text boxes and may enter text or commands corresponding to a certain environmental profile. Alternatively, the user may be shown an entire set of attributes and may select the appropriate attributes for the environmental profile by clicking on various displayed boxes associated with each of the attributes or a set of the attributes. Finally, at operation 710, the customized environmental profile is saved on a memory of the wireless device 610.

Figure 8:
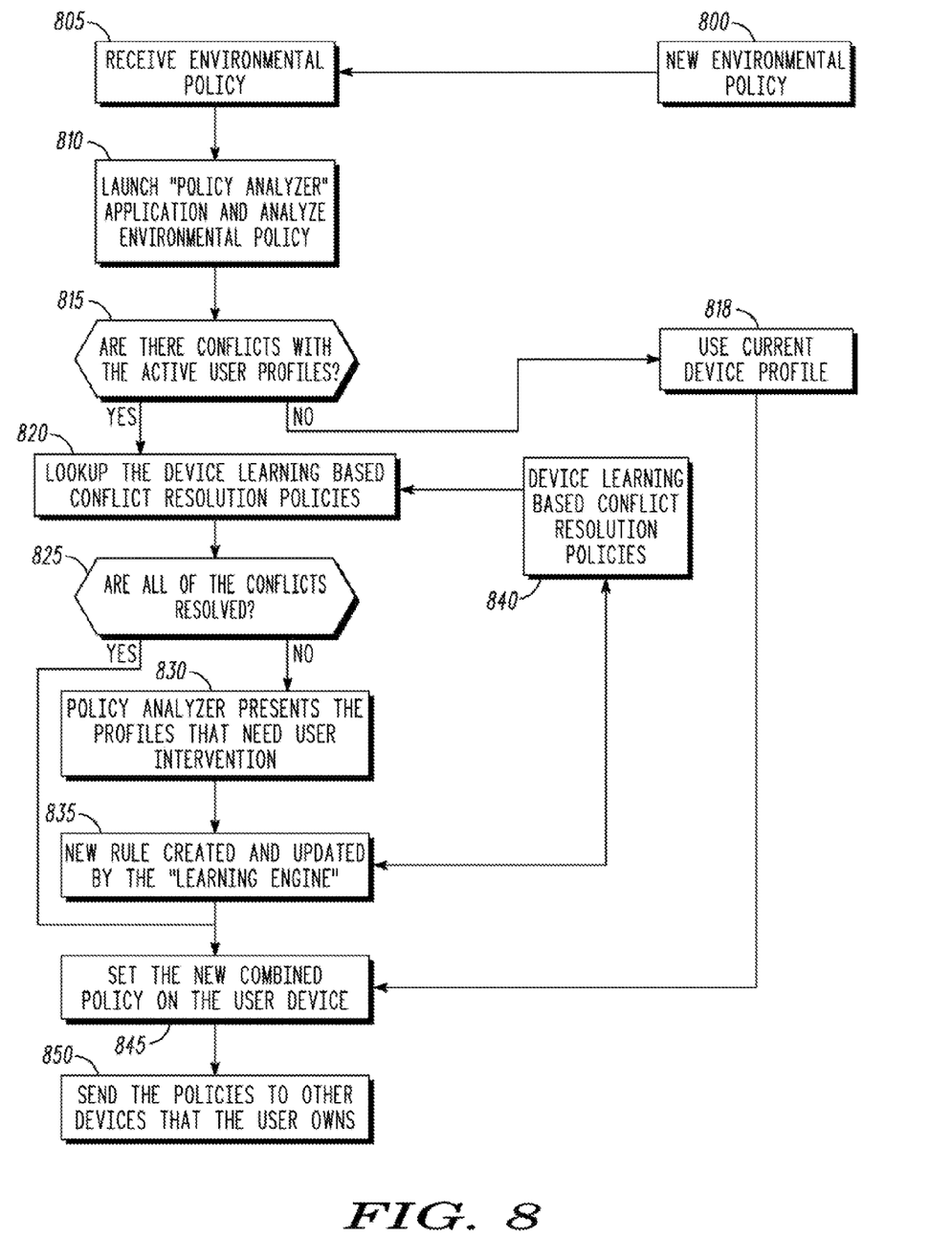
FIG. 8 illustrates a flowchart for selecting an active profile for the wireless device according to at least one embodiment of the invention.

FIG. 8 illustrates a flowchart for selecting an active profile for the wireless device 610 according to at least one embodiment of the invention. First, upon entering an environment 615, a new environmental policy 800 is broadcast via an environmental policy announcer 620 to the wireless device 610, where it is received at operation 805. Next, at operation 810, a "policy analyzer" application is launched by, for example, a processor of the wireless device 610 and the environmental policy is analyzed. At operation 815, a determination is made as to whether there are any conflicts with the active user profiles of the wireless device 610. Reference is made to a current profile device 820 at this time. If "yes" at operation 815, processing proceeds to operation 820. If "no," on the other hand, the current device profile is used 818 and processing proceeds to operation 845.

At operation 820, the wireless device's 610 learning-based conflict resolution policies are looked up from, for example, a memory within the wireless device 610. Next, at operation 825, a determination is made as to whether all of the conflicts have been resolved. If "yes," processing proceeds to operation 845. If "no," processing proceeds to operation 830 where the policy analyzer present the profiles that need user intervention. At operation 835, a new rule is created and updated by a learning engine. The processor within the wireless device 610 may implement the learning engine. At operation 835, an update is sent to the device learning-based conflict resolution policies 840. Processing also proceeds to operation 845 where the new combined policy is set on the wireless device 610. Finally, at operation 850, the policies are sent to other devices that the user owns and/or possesses. The policies may, for example, be sent wirelessly to the other devices.

The teachings discussed above provide the user with the ability to create the user's own control for the wireless device on the fly. The user is also provided with the ability to change the behavior of a particular control. An example of a behavior change for a control is to accept only numbers instead of alphabetic characters.

These teachings also allow for the modification of screen flow during run-time. An example of an original screen flow is: Create Message→Text Message→Enter Destination→Enter Text. An example of a modification of the screen flow is: Create Message→Text Message→Enter Text→Enter Destination.

The ability to combine elements of one or more applications into a new application is also provided. In an example, a device has two different applications, where a first application is for taking a picture and saving it to the wireless device, and a second application is for creating an MMS message body, addressing it to someone in a contacts list, and sending the SMS. The user may now create a third application that takes a picture, saves it as an MMS message body, and addresses it to someone in the contacts list by combining pieces of the first application and the second application dynamically. Another aspect is the ability to create an attach voice modality (and other modalities).

The architecture also has the ability to alter its response to a particular environmental signal. The environmental signal may comprise an indication that the wireless device is in a designated quiet area such as a movie theatre or an opera house. Instead of automatically blocking all signals to a wireless device located in, for example, a movie theater, the architecture may instead negotiate with the environment to determine the most suitable solution. Accordingly, via the negotiation, the response of the wireless device may be altered so that incoming signals can be received but the wireless device will not audibly ring. Instead, the wireless device may vibrate for a short length of time, so that the user is informed that a message has been received without annoying other people within the movie theatre.

Accordingly, unlike prior systems, the wireless device's response to an environmental signal is not static or pre-designed. Instead, a dynamic solution is provided that uses all available services and options to provide an optimal solution in the current context. The environment itself may select the active profile, or the user may assist in the selection of the active profile.

Accordingly, the various embodiments described above allow the user to set the controls and screen flows for a wireless device on the fly, resulting in faster execution of newly configured program instructions. Also, the wireless device may dynamically negotiate with an environment to implement provide maximum functionality to the wireless device in a restricted environment.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method used in a client device, comprising:
   presenting an application behavior specification and a presentation specification during run-time, wherein the application behavior specification is a user modifiable file separate from the application that allows a user to specify a behavior of the application that was not previously available from the application and the presentation specification is a user modifiable file separate from an application that allow the user to specify a presentation that was not previously available;
   receiving at least one input corresponding to a proposed modification to at least one of the application behavior specification and the presentation specification;
   determining permitted modifications to the at least one of the application behavior specification and the presentation specification based on a set of pre-defined rules; and
   generating a new application by modifying the at least one of the application behavior specification at run-time based on the permitted modifications.

2. The method of claim 1, the method being implemented by a processing device associated with a portable wireless device.

3. The method of claim 2, wherein the determining comprises negotiating with a background environment in which the portable wireless device is interacting to determine the permitted modifications.

4. The method of claim 1, the at least one input being received from at least one of a background environment and a user.

5. The method of claim 1, further comprising modifying a screen-flow method during the run-time.

6. The method of claim 1, the modifying comprising combining elements of multiple existing applications into the new application.

7. The method of claim 1, the modifying comprising changing at least one of a graphical modality, haptics modality, audio modality, and a text modality.

8. The method of claim 1, wherein the presenting comprises displaying the application behavior specification separate from the presentation specification.

9. An apparatus, comprising:
   an application layer to present an application behavior specification and a presentation specification, wherein the application behavior specification is a user modifiable file separate from the application that allows a user to specify a behavior of the application that was not previously available from the application and the presentation specification is a user modifiable file separate from an application that allow the user to specify a presentation that was not previously available;
   an engine layer to receive at least one input corresponding to a proposed modification to at least one of the application behavior specification and the presentation specification;
   a modality interface layer to interpret the at least one input and merge the at least one input into an output; and
   an interaction management layer to:
     receive the output,
     determine permitted modifications to the at least one of the application behavior specification and the presentation specification based on a set of pre-defined rules, and
     generate a new application by modifying the at least one of the application behavior specification at run-time based on the permitted modifications.

10. The apparatus of claim 9, wherein the apparatus comprises a portable wireless device.

11. The apparatus of claim 9, further comprising an interface element to receive the at least one input from at least one of a background environment and a user.

12. The apparatus of claim 9, further comprising a display to display the application behavior specification separate from the presentation specification.

13. The apparatus of claim 9, wherein the new application comprises a modification of at least one of a graphical modality, haptics modality, audio modality, and a text modality.

14. A system, comprising:
   a portable wireless device being adapted to:
     present an application behavior specification and a presentation specification, wherein the application behavior specification is a user modifiable file separate from the application that allows a user to specify a behavior of the application that was not previously available from the application and the presentation specification is a user modifiable file separate from an application that allow the user to specify a presentation that was not previously available,
     receive at least one input corresponding to a proposed modification to at least one of the application behavior specification and the presentation specification,
     determine permitted modifications to the at least one of the application behavior specification and the presentation specification based on a set of pre-defined rules, and
     generate a new application by modifying the at least one of the application behavior specification and the presentation specification at run-time based on the permitted modifications; and
   at least one entity to provide the at least one input corresponding to a proposed modification to at least one of the application behavior specification.

15. The system of claim 14, wherein the at least one entity is at least one of a user and a background environment.

16. The system of claim 14, the portable wireless device further comprising an interface element to receive the at least one input from the at least one entity.

17. The system of claim 14, wherein the new application comprises a modification of at least one of a graphical modality, haptics modality, audio modality, and a text modality.

* * * * *